United States Patent
Deguchi et al.

[11] Patent Number: 5,993,351
[45] Date of Patent: Nov. 30, 1999

[54] CONTROL DEVICE FOR HYBRID VEHICLE

[75] Inventors: Yoshitaka Deguchi, Yokosuka; Kazuma Okura, Yokohama; Yasuhiko Kitajima, Zushi; Susumu Komiyama, Yokohama, all of Japan

[73] Assignee: Nissan Motor Co., Ltd., Yokohama, Japan

[21] Appl. No.: 09/205,235

[22] Filed: Dec. 4, 1998

[30] Foreign Application Priority Data

Dec. 5, 1997 [JP] Japan .................................. 9-335866

[51] Int. Cl.$^6$ .................................................. B60K 41/02
[52] U.S. Cl. .................................. 477/5; 477/174; 477/3
[58] Field of Search .............................. 477/2, 5, 6, 7, 477/166, 174, 175

[56] References Cited

U.S. PATENT DOCUMENTS

| | | | |
|---|---|---|---|
| 4,335,429 | 6/1982 | Kawatsu | 477/5 X |
| 4,400,997 | 8/1983 | Fiala | 192/2.58 X |
| 5,603,242 | 2/1997 | Krieger | 74/335 |
| 5,775,449 | 7/1998 | Moroto et al. | 477/5 X |
| 5,905,346 | 5/1999 | Yamada et al. | 477/13 X |
| 5,916,130 | 6/1999 | Nakae et al. | 701/114 X |

*Primary Examiner*—Khoi Q. Ta
*Attorney, Agent, or Firm*—Foley & Lardner

[57] ABSTRACT

A shock when switching between the motive force of a motor and an engine is avoided. A first electrical motor mechanically connected to an engine and a second electrical motor connected mechanically to an engine through a clutch is provided. In a hybrid vehicle in which motive force is transmitted to the drive wheels through a transmission from a second electric motor, it is decided whether or not to release the clutch based on the vehicle speed detected value and the required motive force detected value. The engine output at that time is estimated. Thus if it is decided to release the clutch, the output of the second electrical motor is controlled so that the generated torque corresponds to said estimated output. The output of the first electrical motor is controlled so that the torque generated by the second electrical motor is absorbed. Hence the sum of both outputs is approximately 0. In this way, there is no shock when the clutch is released and the switch is made from an engine brake due to the engine to a generator brake due to the second electrical motor and driving performance is enhanced.

6 Claims, 5 Drawing Sheets

CONTROL DEVICE FOR HYBRID VEHICLE

FIELD OF THE INVENTION

The present invention relates to a control device for a hybrid vehicle which uses an electrical engine and or an internal combustion engine as a motive source.

BACKGROUND OF THE INVENTION

A hybrid vehicle which uses the mechanical force of an engine and or the mechanical force of a motor as the motive source for the vehicle is known in the prior art.

The engine and the motor are connected by a clutch. When the output of the engine and the output of the motor are switched by the clutch on the basis of driving conditions, a shock is generated at the switch if there is a difference between the two outputs. As a result, there is a deterioration in driving conditions and comfort.

For example, it is known in the art, that when the vehicle is decelerating using the engine as an engine brake on the basis of the friction torque of the engine, it is possible to switch to generating electricity by using the motor as a generator brake and using the energy the vehicle has when decelerating (for example refer to published application . . . ). However when the clutch is released and a switch is made from the engine to the motor, a shock is generated when there is a difference between the braking force of the engine and the braking force of the motor.

SUMMARY OF THE INVENTION

It is the object of the present invention to avoid shocks when switching between the motive force of the engine and that of the motor by using the clutch.

In order to achieve the above object the invention provides a control device for a hybrid vehicle which transmits motive force to drive wheels through a transmission which comprises an engine, a first drive motor connected to the engine, and a second drive motor which transmits motive forth to the transmission connected through a clutch to the engine. The control device further comprises a sensor for detecting a required motive force of the vehicle, a sensor for detecting a vehicle speed, a microprocessor which is programmed to decide whether or not to release the clutch on the basis of a detected value of a required motive force and a detected value of a vehicle speed, to estimate the output of the engine when it has been decided to release the clutch, to control an output of the second motor so that generated torque corresponds to the estimated output in the event that it is decided to release the clutch, and to control an output of the first motor so that generated torque of the second motor is absorbed and so that the sum of both the outputs becomes approximately zero, and to release the clutch when an output of the second motor corresponds with an estimated output of the engine.

The above and other objects, features and advantages of the invention will become apparent from reading of the following detailed description of the preferred embodiments taken in conjunction with the accompanying drawings.

DESCRIPTION OF THE PREFERRED EMBODIMENTS

The present embodiment is applied to a hybrid vehicle for example a "series parallel hybrid vehicle" which runs on the motor at times of low load and runs on the internal combustion engine at times of high load.

Figure 1:
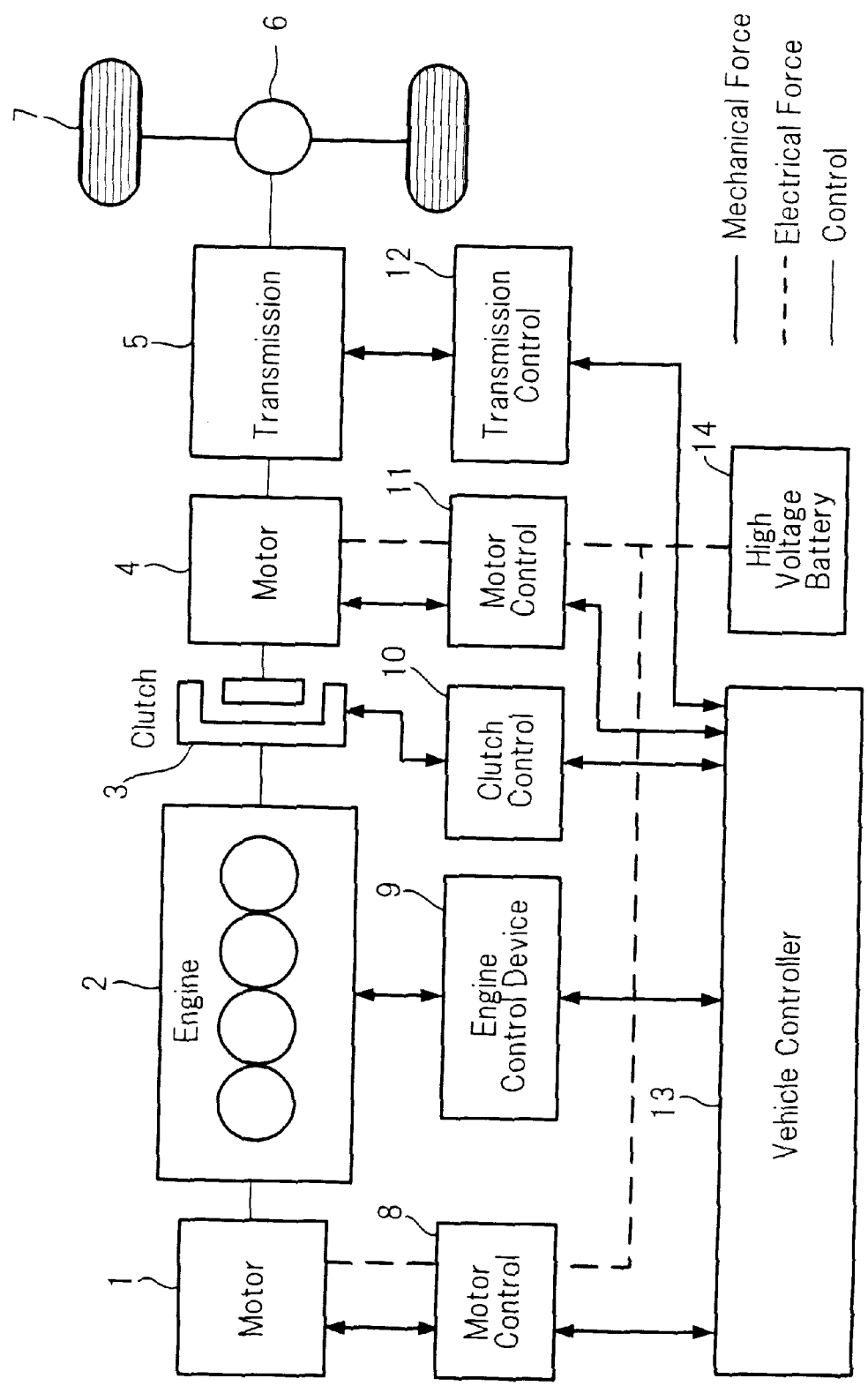
FIG. 1 shows a first embodiment of the present invention.

FIG. 1 is a schematic figure showing the layout of the present invention. The thick solid line in the figure shows the transmission circuit of mechanical force, the broken line shows the transmission circuit of electrical force and the thin solid line shows the control line.

The power train of the vehicle comprises the first motor 1, engine 2, clutch (connection/release device) 3, a second motor 4, transmission 5 and a power transmission device 6. The output shaft of the motor 1, the output shaft of the engine 2 and the input shaft of the clutch 3 are mutually connected. The output shaft of the clutch 3, the output shaft of the motor 4 and the input shaft of the transmission 5 are mutually connected. When the clutch 3 is engaged, the motor 1, the engine 2 and the motor 4 can function as the motive source of the vehicle. When the clutch 3 is released, only the motor 4 functions as the motive source.

The motor 1 and 4 can be used as an A/C induction motor, an A/C synchronous motor, or a D/C dynamo-electric motor or the like. The motor 1, 4 not only have the function of a motor when supplied with electricity but can also generate electricity by being driven by the engine 2 or being driven by the running energy of the vehicle.

Furthermore it is possible to use gasoline, diesel or other engines. The clutch 3 is a powder clutch which is controlled electro-magnetically and which can freely regulate the transmitted torque. It is also possible to employ a dry-type single disc clutch or a wet process multiple disc clutch as the clutch. The transmission 4 is for example a belt type continuous variable transmission CVT and can vary in the drive ratio continuously. However it is also possible to use the usual geared transmission as the transmission 4.

The motor 1, the engine 2, the clutch 3, the motor 4, and the transmission 5 are controlled by the respective control devices 8–12. When an AC dynamo-electric motor is used as the motor 1,4, an inverter is used in the control device 8, 11 which converts the direct current of the high voltage battery 14 into an alternating current and supplies it to the motor 1, 4. Otherwise the generator alternating current of the motor 1, 4 is converted and charges the high voltage battery 14. When a DC dynamo-electric motor is used in the motor 1,4, a DC/DC converter is used in the motor control device 8, 11 and regulates the direct current of the high voltage battery 14 to a fixed voltage and supplies the motor 1, 4 or regulates the generated direct current of the motor 1, 4 to a fixed voltage and charges the high voltage battery 14. In either case, the motor control device 8, 11 can control the output torque and the rotational speed of the motor 1, 4.

The engine control device 9 performs functions such as control of the fuel injection into the engine, ignition control and the like. The clutch control device 10 controls the transmitted torque by converting the exciting current of the powder clutch 3. The transmission control device 12 controls the drive ratio of the transmission 5.

The vehicle controller 13 is comprised of a microcomputer and related component parts and controls the control devices 8–12 and the operation and function of the vehicle.

Figure 2:
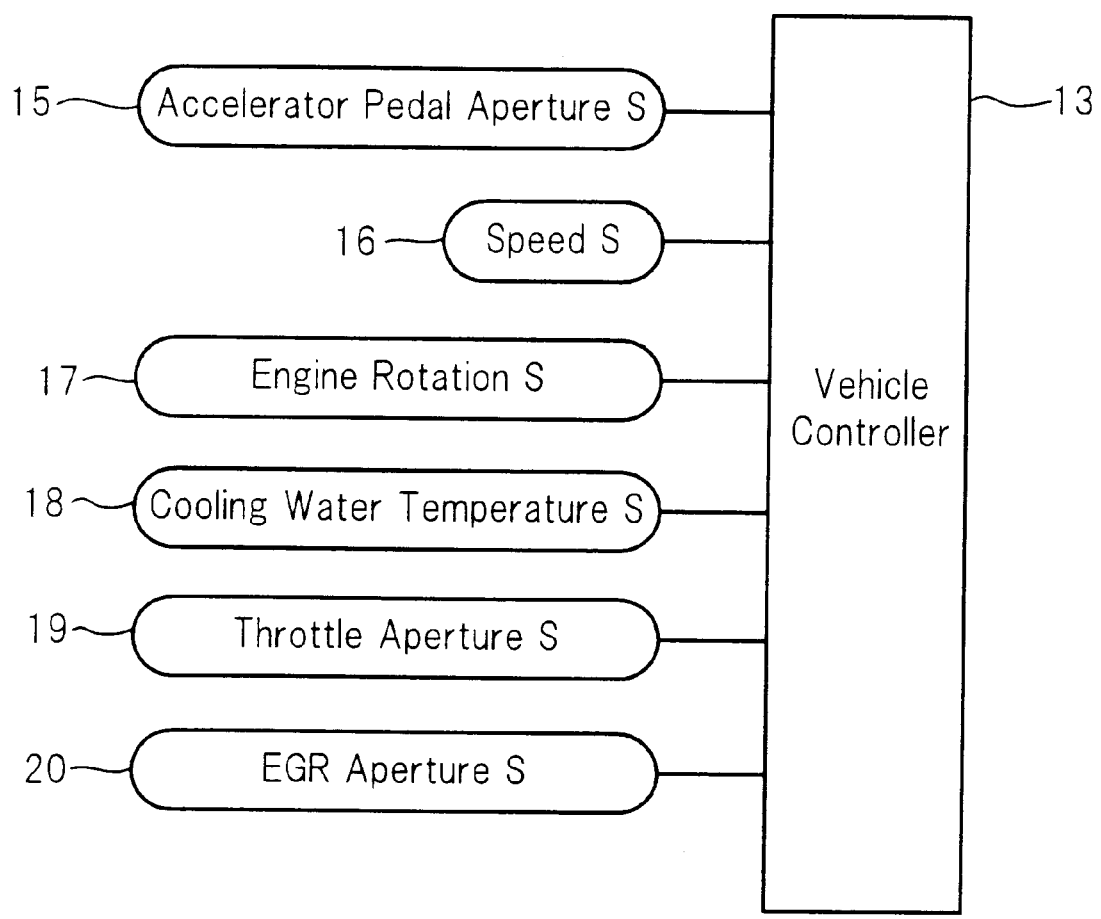
FIG. 2 shows a block diagram of the control device.

As shown in FIG. 2, the following sensors, or the like, input detection signals into the vehicle controller 13: the accelerator pedal sensor 15 which detects the degree of depression of the accelerator pedal, the vehicle speed sensor 16 which detects the running speed of the vehicle, the rev sensor 17 which detects the rotation speed of the engine 2, the temperature sensor 18 which detects the temperature of the cooling water of the engine 2, the throttle aperture sensor 19 which detects the aperture of the throttle valve of the engine 2 and the EGR aperture sensor 20 which detects the aperture of the EGR valve.

The vehicle controller 13 controls the disengagement of the clutch 3 at times such as during braking (coasting) the vehicle when the shift is made from a state in which the vehicle is running while applying an engine brake by the engine 2 to a state where the generating operation of the braking energy of the motor 4 is applied, that is to say, where the motor 4 acts as an electrical generator. Hence the running energy which the vehicle has when braking is used to charge the battery. The controller is also used when the motor 4 is used to drive the vehicle during low speed running. However at these times, if there is a difference between the engine braking force of the engine 2 and the braking force of the motor 4, a shock will be generated when the clutch is disengaged. In order to prevent the generation of shocks at switching, as shown below, the switching operation of the clutch is controlled while the output force of the motor 1, 4 is controlled.

Figure 3:
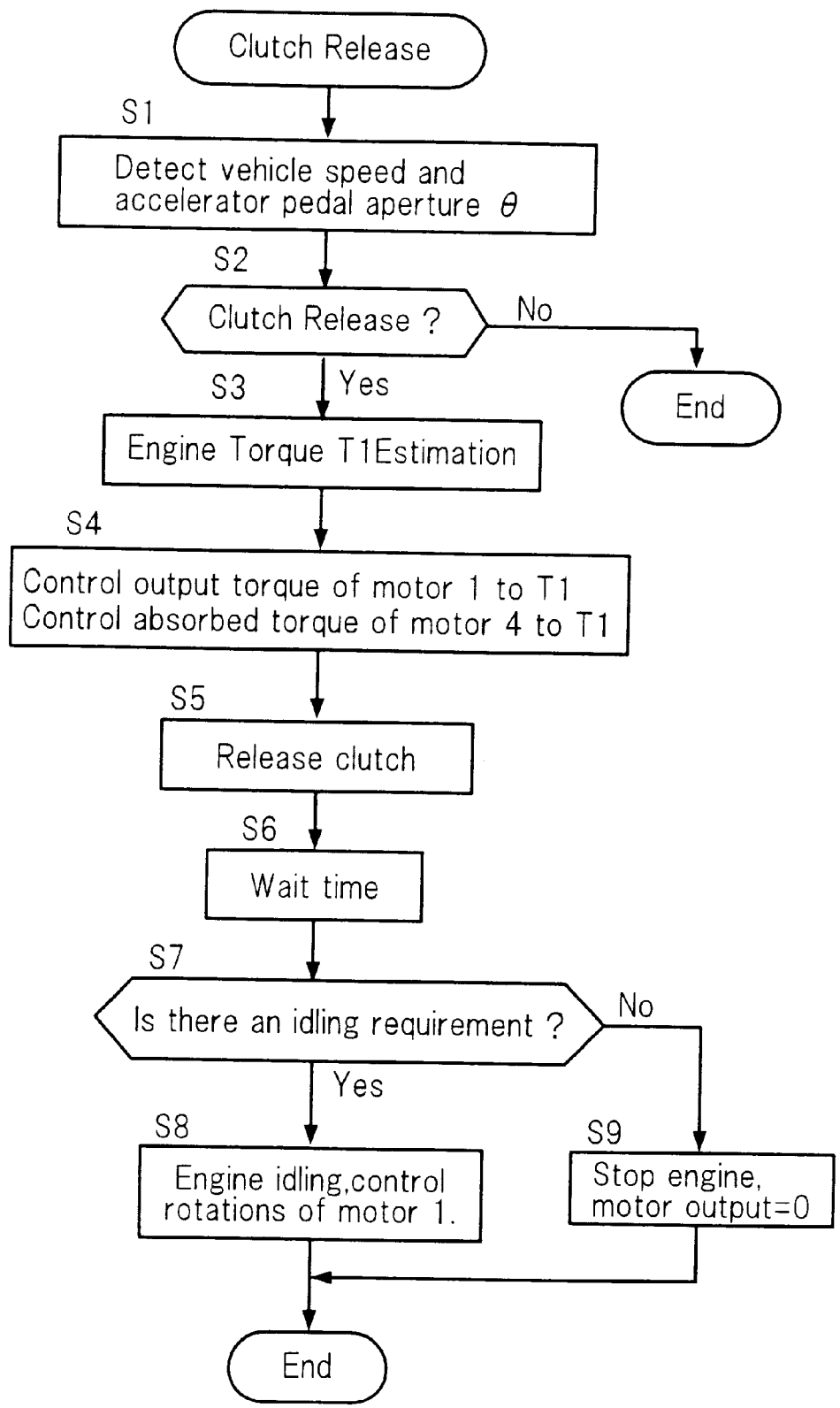
FIG. 3 is a flow chart showing the clutch release control program.
Figure 4:
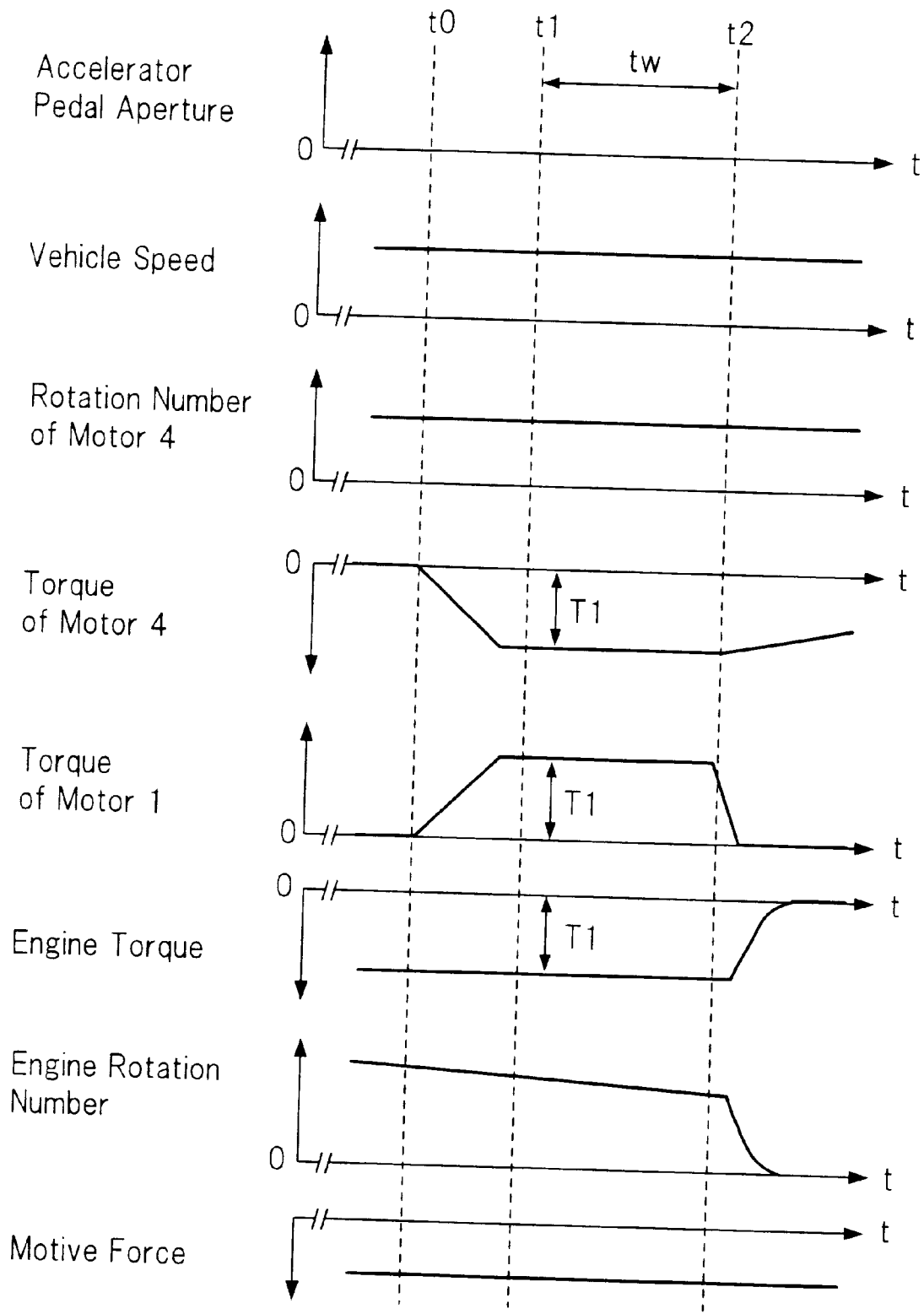
FIG. 4 shows the operational characteristics of the engine and the motor when the clutch is released.

FIG. 3 is a flowchart showing this type of control. FIG. 4 shows the relation between the output of the motor 1,4 and the engine 2 when the switching control is performed.

The vehicle controller 13 performs a control program shown in FIG. 3 at fixed time intervals.

This may be explained by a step 1 where the aperture θ of the accelerator pedal of the engine is detected. In a step 2, it is decided whether or not to release the clutch 3, mainly at times of braking or low speed running, on the basis of the aperture θ of the accelerator pedal and the vehicle speed V.

Figure 5:
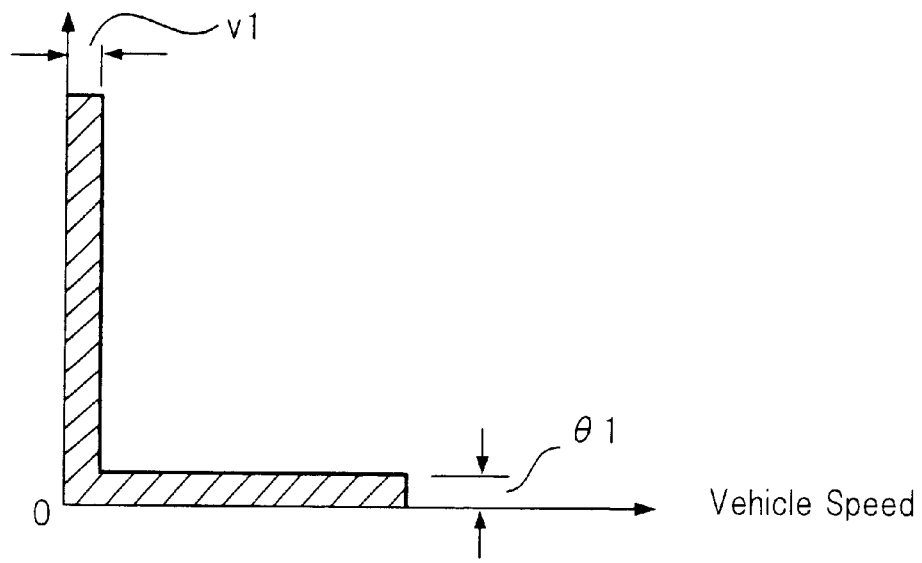
FIG. 5 shows an example of a clutch release decision map.

FIG. 5 shows an example of a clutch release decision map. When the aperture θ of the accelerator pedal and the vehicle speed V enter the hatched region in FIG. 5, the clutch is released. The aperture θ1 of the accelerator pedal is the standard value for deciding whether the accelerator pedal is in a state of release or in a state of being depressed. This value is set close to 0. When the aperture θ of the accelerator pedal is greater than the standard value θ1 and the accelerator pedal is being depressed, the clutch 3 is released when the vehicle speed falls below fixed value V1 and the switch is performed to running on the motor 4. On the other hand, even when the vehicle speed is large, the clutch 3 is released during coasting when the aperture θ of the accelerator pedal is below a standard value θ1 and the accelerator pedal is in a state of release. Since when the driver has released the accelerator pedal, motive force is not required by the engine 2, the vehicle may be braked using only the generator brake of the motor 4 from a high vehicle speed V with the clutch 3 released. The amount of braking energy retrieved may thus be increased.

Next in a step 3, before the switch from the engine 2 to the motor 4, firstly the friction torque T1 of the engine 2 is estimated. As a result, the torque of the engine 2 before the switch is made to correspond with the torque of the motor 4 after the switch.

However the engine 2 performs fuel cutting in order to reduce fuel consumption at times such as when the accelerator pedal is released. After the release of the accelerator pedal, fuel cutting is only performed after measuring or detecting whether the pressure in the air intake pipe which supports exhaust gas purification is below a fixed value. Since the intake pressure can suddenly vary in the period from the release of the accelerator pedal to fuel cutting and as a result the amount of fuel injected can vary, it is difficult to estimate the friction torque of the engine accurately.

In order to estimate an accurate friction torque from a stable engine state and avoid shocks when the clutch is released, in the step 2 above, the decision to release the clutch is performed on the basis of the following conditions. The conditions for deciding to release the clutch are:
1. Whether the pressure in the intake pipe of the engine is below a fixed value
2. Whether fuel cutting has been initiated.
3. Whether the release of the accelerator pedal has continued for a fixed period.

The result of the clutch release decision completes the release process and results in the clutch 3 not being released or the performance of clutch 3 release after the step 3, when the decision is made to release the clutch 3.

Figure 6:
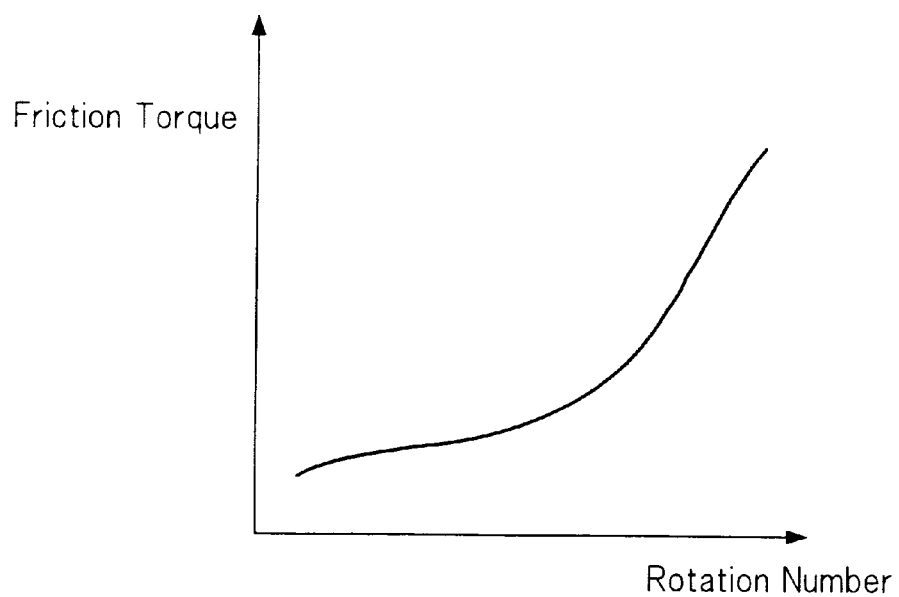
FIG. 6 shows the friction torque of the engine.

As shown in FIG. 6, the estimation in the step 3 of friction torque T1 of the engine 2 shows that friction torque increases with increases in the revolutions [r/m] of the engine 2.

The friction torque of the engine 2 increases when fuel cutting is greater than fuel supply and increases with decreases in the temperature of the engine cooling water or the lubrication oil temperature. Furthermore it increases when the throttle valve aperture or the EGR valve aperture (when exhaust gas purification is low) is small. Even when a valve timing variable mechanism varies the intake valve of the engine 2 and the opening and closing timing of the exhaust valve, the friction torque of the engine 2 varies.

Hence friction torque is estimated beforehand with respect to engine rotation number, the presence or absence of fuel cutting, the engine temperature (temperature of cooling water or temperature of lubrication oil), it is reduced to a map and stored in the memory of the vehicle controller 13. The friction torque is calculated from a table and estimated depending on the state of the engine 2. Then the estimated friction torque is corrected on the basis of the throttle valve aperture, the aperture of the EGR valve and the opening and closing timing of the intake valve.

Friction torque T1 is estimated in this way (since however the engine is receiving energy from the exterior, torque takes a negative value). In a step 4, as shown in FIG. 4, after clutch release is decided at time t0, the output motive torque of the motor 1 is varied to T1 (the sign is on the opposite plus side to the friction torque of the engine 2 and so the absolute value is equal) and the generating braking torque of the motor 4 (the absorption torque) is varied to minus T1. Both are respectively varied by the same increasing ratio.

Since the output drive torque of the motor 1 and the generating braking torque of the motor 4 cancel each other out, the braking torque for braking the vehicle is always the friction torque T1 of the engine 2. At this time, a current is supplied from the high voltage battery 14 through the motor control device 8 to the motor 1 and the motor 1 generates torque. This torque is absorbed by the motor 4 and returns to the high voltage battery through the motor control device 11. However strictly speaking, the charging current charges the battery 14 with only a tiny loss to the motor 1, 4 and the motor control device 8.

When the output torque of motors 1 and 4 become respectively T1 and –T1 (time t1 in FIG. 4), the clutch 3 is released in a step 5. Since there is a delay in the transmitted torque actually reaching 0 even when the powder clutch has the exciting current in the off position, in a step 6, waiting for a fixed period of (tw) is performed. When the fixed time period (tw) has elapsed (time t2 in FIG. 4), it is decided that the release of the clutch 3 has been completed and the process proceeds to a step 7.

In the step 7, a search is made as to whether there is an idling requirement placed on the engine 2. For example, when the charging condition of the battery 14 is low during engine warm-up, even after the clutch is released, driving is continued without stopping the engine 2. If there is an idling requirement, the process continues to step 8, and control is performed so that the engine 2 idles and the idling rotation number is fixed by the motor 1. On the other hand, if there is not an idling requirement, the process continues to step 9, the engine 2 is stopped and the output of the motor 1 is put to 0.

As shown above, it is decided whether or not to release the clutch 3 in order to switch from the engine 2 to the motor 4 based on the accelerator aperture detected value θ which represents the required driving force of the vehicle and the detected vehicle speed V. After the decision to release the clutch 3, the friction torque T1 of the engine 2 is estimated.

Then the output of the motor 1 is controlled so that the torque of the motor 1 reaches T1 and the output of the motor 4 is controlled (generator operation) so that the torque of the motor 4 reaches −T1. The values are varied with the same characteristics so that the sum of both torque is normally 0. Since when motor 1 has a torque of T1 and motor 4 has a torque of −T1, the clutch 3 is released. There is no shock when the switch is made from the engine brake due to the engine 2 to the generator brake due to the motor 4. Hence it is possible to realize good driving conditions. As shown in FIG. 4, there is no variation in the motive force of the vehicle before clutch release (before time t1) and the motive force after clutch release (after time t2) and thus there is no shock at time of release of the clutch. Furthermore even if there are discrepancies in response time or in operational characteristics due to deterioration of the clutch, they have no influence and the switch shock can be prevented. Furthermore as well as avoiding a difference between the rotation number of the output shaft and the input shaft at time of clutch release, since it is possible to place the transmitted torque at time of clutch release to approximately 0, deterioration of the clutch can be avoided and its life span can be increased.

In the above embodiment, the discussion was based on an example of a power line where the output shaft of the motor 1, the output shaft of the engine 2, and the input shaft of the clutch 3 are connected, and the output shaft of the clutch 3, the output shaft of the motor 4 and the input shaft of the transmission 5 are connected. When the clutch is connected, the motor 1, the engine 2, the input shaft of the clutch 3 and the rotational speed of the motor 4 are all equal. Thus after the release of the clutch 3, the friction torque −T1 of the engine 2 is estimated and the motor 1 is controlled so that the output torque of the motor 1 becomes T1 and the motor 4 is controlled so that the output torque of the motor 4 becomes −T1. When the motor 1 is outputting a torque of T1 and the motor 4 is outputting a torque of −T1, the clutch is released.

However when the motor 1, the engine 2, the clutch 3, and the motor 4 are connected through a plurality of gears, the rotational speed of their moving parts is not equal when the clutch is connected. In that case, output control is performed instead of the torque control above at the time of clutch release. More precisely, after the decision to release the clutch 3, the output −F of the engine 2 is estimated and the motor 1 is controlled so that the output of the motor 1 becomes F and, at the same time, the motor 4 is controlled so that the output of the motor 4 becomes −F. When the motor 1 operates at an output of F and the motor 4 operates at an output of −F, the clutch is released. Furthermore the output of the motor can be determined on the basis of the product of the torque and the rotational speed or the product of the motive voltage and the motive current.

This embodiment discussed the example of the releasing the clutch 3 when the vehicle is decelerating and generating energy with the motor 4. Even when the accelerator pedal is depressed, the clutch 3 will be released and a switch from the engine 2 to the motor 4 will be performed if vehicle speed falls below a fixed value for lower vehicle speed. At this time, the output of the engine 2 up to that point does not take a negative value, as when the vehicle is decelerating, but has a positive value. Thus in this case, control of the output characteristics of the motor 1, 4 must be performed in the inverse direction to that described above. In other words, the output of the motor 4 is controlled to a positive value and this output is absorbed by the motor 1 acting as a generator. When the output of the motor 4 corresponds with the output of the engine 2, the clutch 3 is released.

The present invention is not limited to the above embodiments. The present invention can be adapted to all types of hybrid vehicles which switch the output of the motor and the engine substantially through the clutch depending on the driving conditions. Furthermore the present invention contains all variations within the technical scope of the invention as claimed and as understood by the person skilled in the art.

We claim:

1. A control device for a hybrid vehicle which transmits motive force to drive wheels through a transmission comprising an engine, a first drive motor connected to said engine, and a second drive motor which transmits motive force to said transmission connected through a clutch to said engine wherein said control device further comprises a sensor for detecting a required motive force of said vehicle, a sensor for detecting a vehicle speed, a microprocessor which is programmed to decide whether or not to release said clutch on the basis of a detected value of a required motive force and a detected value of a vehicle speed, to estimate the output of said engine when it has been decided to release said clutch, to control an output of said second motor so that generated torque corresponds to said estimated output in the event that it is decided to release said clutch, and to control an output of said first motor so that generated torque of said second motor is absorbed and so that the sum of both said outputs becomes approximately zero, and to release said clutch when an output of said second motor corresponds with an estimated output of said engine.

2. A control device for a hybrid vehicle as defined in claim 1 wherein said microprocessor is further programmed to decide an idling requirement of said engine when said clutch is released, to control said idling when such an idling requirement exists and to stop said engine when there is not an idling requirement.

3. A control device for a hybrid vehicle as defined in claim 2 wherein said microprocessor is programmed to place an output of said first motive motor to a value of zero when said engine is stopped after said clutch is released.

4. A control device for a hybrid vehicle as defined in claim 1 wherein said microprocessor programmed to decide to release said clutch when said detected value of said required motive output is approximately zero or said detected value of said vehicle speed is below a fixed lower speed value.

5. A control device for a hybrid vehicle as defined in claim 1 wherein said microprocessor is programmed to calculate an engine friction torque based on a rotational speed of said engine, a throttle valve aperture, and the presence or absence of fuel cutting and to estimate said output.

6. A hybrid vehicle which transmits motive force to drive wheels through a transmission comprising

- an engine,
- a first drive motor connected to said engine, and
- a second drive motor which transmits motive force to said transmission connected through a clutch to said engine wherein said hybrid vehicle further comprises

- a sensor for detecting a required motive force of said vehicle,
- a sensor for detecting a vehicle speed,
- a microprocessor which is programmed
- to decide whether or not to release said clutch on the basis of a detected value of a required motive force and a detected value of a vehicle speed,
- to estimate the output of said engine when it has been decided to release said clutch,
- to control an output of said second motor so that generated torque corresponds to said estimated output in the event that it is decided to release said clutch, and to control an output of said first motor so that generated torque of said second motor is absorbed and so that the sum of both said outputs becomes approximately zero, and
- to release said clutch when an output of said second motor corresponds with an estimated output of said engine.

\* \* \* \* \*